Dec. 8, 1964 R. R. HENDERSON 3,160,860

METHOD AND MEANS FOR MANUFACTURE OF MAGNETIC CORES

Filed Oct. 30, 1958 4 Sheets-Sheet 1

INVENTOR.
ROBERT R. HENDERSON
BY Gordon R. Sanborn

AGENT

METHOD AND MEANS FOR MANUFACTURE OF MAGNETIC CORES

Filed Oct. 30, 1958

4 Sheets-Sheet 2

INVENTOR.
ROBERT R. HENDERSON
BY Gordon R. Sanborn
AGENT

INVENTOR.
ROBERT R. HENDERSON
BY Gordon K. Sanborn
AGENT

Dec. 8, 1964 R. R. HENDERSON 3,160,860

METHOD AND MEANS FOR MANUFACTURE OF MAGNETIC CORES

Filed Oct. 30, 1958 4 Sheets-Sheet 4

INVENTOR.
ROBERT R. HENDERSON
BY Gordon R. Sanborn

AGENT

United States Patent Office 3,160,860
Patented Dec. 8, 1964

3,160,860

METHOD AND MEANS FOR MANUFACTURE OF MAGNETIC CORES

Robert R. Henderson, Detroit, Mich., assignor to Burroughs Corporation, Detroit, Mich., a corporation of Michigan Filed Oct. 30, 1958, Ser. No. 770,689
12 Claims. (Cl. 340—174)

Figure 1:
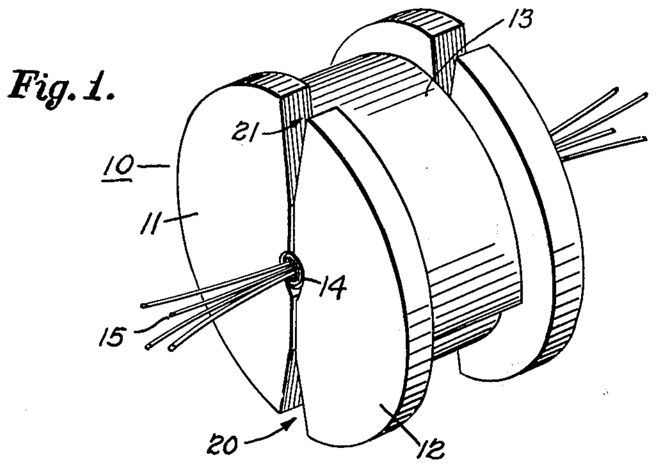

The present invention relates to signal switching and storage elements and matrices thereof, and more particularly to an improved method and means for manufacturing individual magnetic signal storage elements and matrices composed of a large number of such elements.

Cores of ferromagnetic material exhibiting a large retentivity and preferably although not necessarily a substantially rectangular hysteresis loop characteristic are widely used at the present time as multi-stable state devices in the signal generating, switching, and storage arrangements of electrical computing devices. A large number of such cores may be arranged in an array upon a plurality of conductors to provide a switching or memory matrix such as that described in an article by J. A. Rachman entitled "A Myriabit Magnetic-Core Matrix Memory" which appeared on pages 1407–1420 in the October 1953 "Proceedings of the Institute of Radio Engineers." The array described in that article and similar magnetic core matrices have been produced by manually threading the conductors of the matrix through the cores. In the event the person doing the threading of conductors through the cores makes a mistake, or if a core is found to be defective subsequent to completion of the matrix a considerable amount of effort is required to replace the defective core.

To overcome such difficulties associated with the manufacture of multi-core matrices an improved method of manufacture has been suggested which consists essentially of wrapping thin strips of magnetic material having the requisite hysteresis loop characteristics about the various conductors of a pre-arranged array of conductors, thereby eliminating the task of threading each individual wire through the correct core. This method may also be utilized to produce individual signal storage elements, with the matrix then being constructed by soldering or otherwise attaching the wires of the individual units in a predetermined pattern. An important advantage of a matrix composed of cores manufactured by such a wrapping procedure is that a defective core can be replaced by unwrapping the strip of magnetic material, and replacing it with a new strip. Thus the wiring arrangement need not be disturbed for the replacement of a defective core.

The above-described method of producing cores and matrices of cores is a major improvement over earlier methods, but it is found that in the wrapping of a thin strip of magnetic material about a conductor the air gaps between adjacent wraps of the material tend to vary from core to core and therefore the signal characteristics of the cores so produced tend to vary. It is therefore necessary that the strip of magnetic material be wrapped about the bundle of wires in a manner such that successive wraps are compactly placed upon preceding wraps with a minimum amount of air being trapped between adjacent wraps. Reducing the amount of air trapped between adjacent wraps not only reduces the variations in signal characteristics of different cores but also increases the efficiency of the cores. The application of tension to the tape during the wrapping operation to provide a compact element helps avoid the air gaps, but in general the material is not strong enough to permit the application of sufficient tension during the wrapping operation and a certain undesirable amount of air becomes trapped between adjacent wraps. It is also found that the amount of tension applied to the tape during the wrapping operation affects the signal characteristics of the resulting core and thus the tension applied to each core must be carefully controlled if variation of the characteristics of the cores is to be avoided. The application of uniform tension during the wrapping operation, however, proves to be difficult.

It is therefore an object of the present invention to provide an improved method of manufacturing multistable state devices using strips of ferromagnetic material.

Another object of the present invention is to provide a device for compactly wrapping a thin strip of ferromagnetic material about a plurality of conductors to produce a bistable-state signal storage element.

A further object of the present invention is to provide a simplified and improved method of manufacturing a multi-core matrix in which the signal characteristics of the various cores in the matrix are substantially uniform.

Another object is to provide a device for compactly wrapping a thin strip of material about a bundle of wires or other supporting elements for the material.

The device provided in accordance with the present invention may be described as a wrapping device and is preferably constructed of nonconductive and nonmagnetic material. A preferred embodiment of the wrapping device is in the form of a right circular cylinder having a central axial bore or opening adapted to encompass a plurality of conductors which has a thin strip of ferromagnetic material adhered thereto, with the contacting surface between the bore surface and the conductors and tape being such that upon rotation of the wrapping device while the conductors are maintained stationary the material is compactly wrapped about the conductors. The wrapping device is either provided with an opening along a diametral plane or is composed of two parts held together in a manner which permits expansion of the bore or opening as the tape is being wound about the conductors. Compressional means such as a spring encompassing the cylinder provides compressional force upon the material and the conductors during the wrapping operation in a manner such that undue stress upon the material is avoided while air gaps between successive wraps is prevented.

In accordance with the new method of producing a matrix of cores, the conductors about which the cores are to be disposed are first arranged in a predetermined manner to provide a plurality of rows of bundles of conductors each presenting a longitudinal section for receiving the thin strip of magnetic material, a strip of material is adhered to each bundle, separate wrapping elements are placed over each bundle and the tape adhered thereto, and then the wrapping elements are rotated while compressional force is maintained on each strip and bundle. Thus an entire matrix of cores is easily and rapidly produced. The wrapping devices are preferably made of an inexpensive nonmagnetic and nonconductive material such as any of a number of well-known plastic compounds and therefore can be left in place about the core to prevent unwrapping of the ferromagnetic material.

Figure 6:
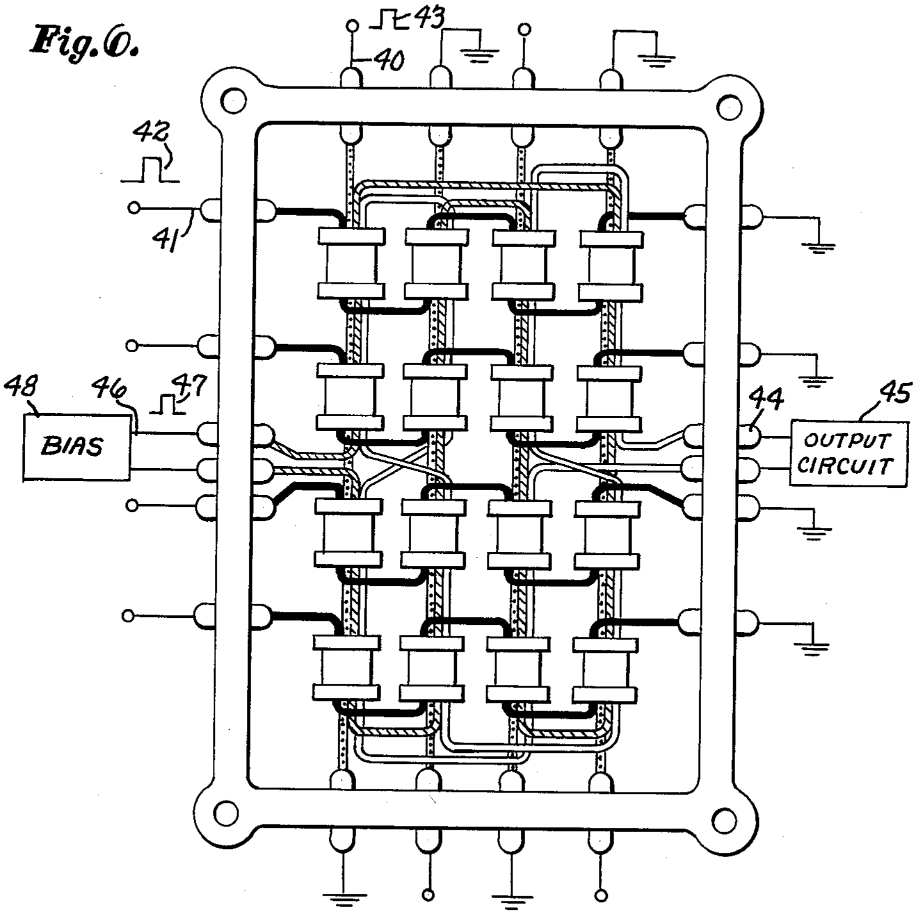
Figure 4:
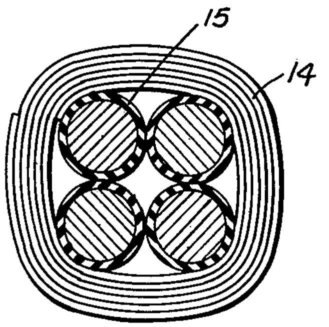
Figure 5:
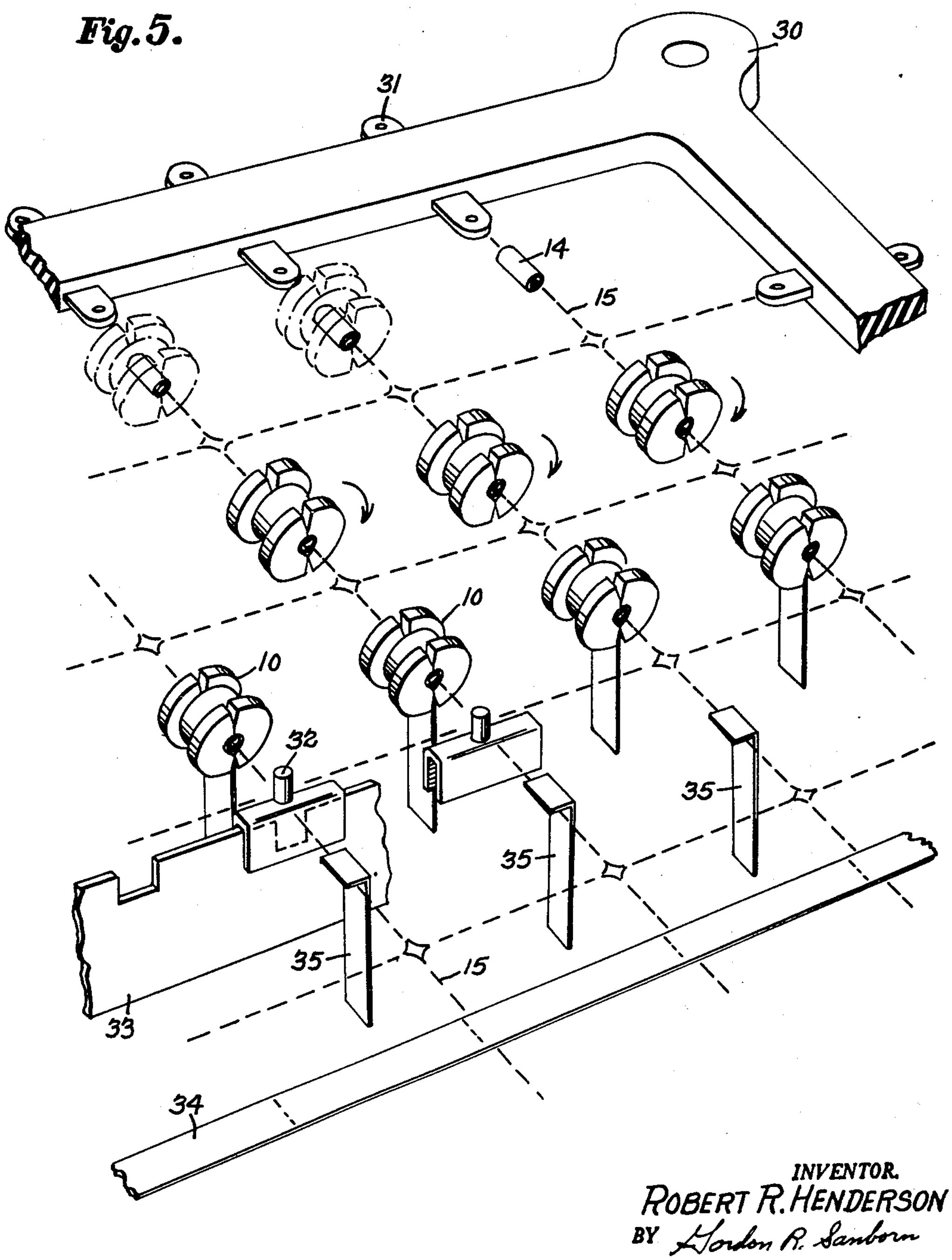

These and other objects of the present invention are set forth in the appended claims. The invention itself, however, both as to its organization and method of operation will be more clearly understood from the following description when read in conjunction with the attached drawings in which FIG. 1 is a perspective view of the wrapping device of the present invention which is disposed about a completed core, FIG. 2 is a perspective view of the three components which form the embodiment of the present invention shown assembled in FIG. 1, FIG. 3A is an end view of the wrapping device positioned above a plurality of conductors having a thin strip of magnetic material adhered thereto in preparation for the beginning of the wrapping operation, FIG. 3B is an end view of the wrapping device with the conductors and magnetic material of FIG. 3A having been advanced to an intermediate position occupied during the entrance of the conductors and material to the central axial opening of the device, FIG. 3C is an end view of the device with the conductors and material positioned within the central axial opening and prior to rotation of the device, FIG. 3D is an end view of a completed core with the wrapping device positioned about the core, FIG. 4 is an enlarged cross-section of one core and its associated conductors produced utilizing the wrapping device of the present invention, FIG. 5 is an enlarged perspective of a portion of a matrix illustrating the various steps of the improved method for producing a multi-core matrix, and FIG. 6 is a top view of a completed matrix illustrating a preferred wiring layout for construction of a matrix in accordance with the present invention and also showing in block form some of the control devices for utilizing a core matrix in which each core surrounds four conductors.

Figure 2:
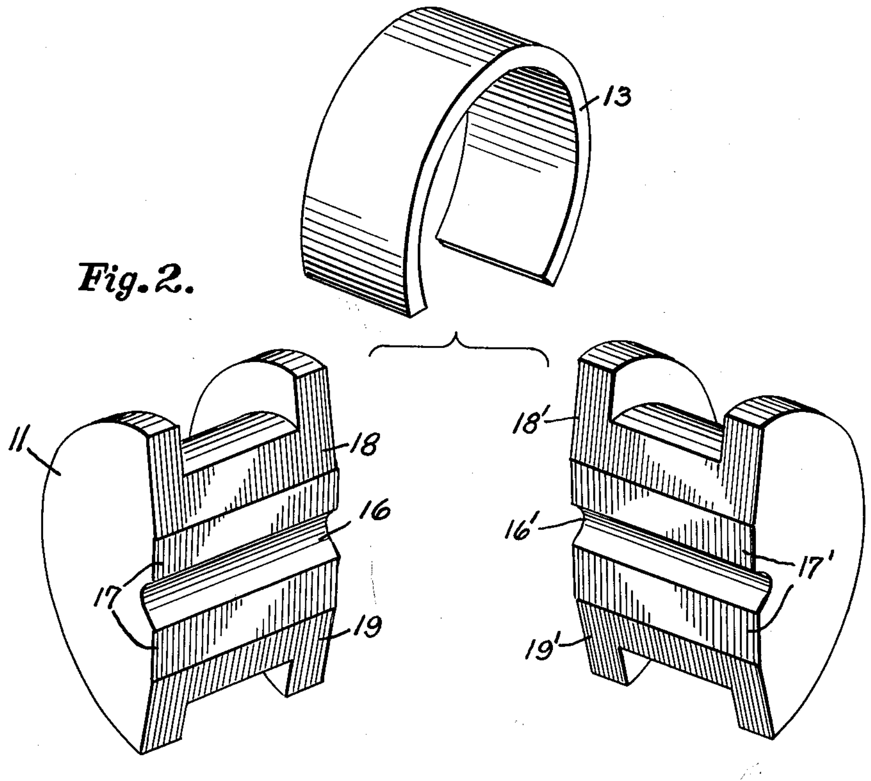

Referring now to FIGS. 1 and 2 there is illustrated a preferred form of the wrapping device of the present invention which comprises a first right cylinder 10 composed of second and third right cylinders 11 and 12 which are of substantially semicircular cross-section. An arcuate spring 13 is positioned about the second and third cylinders 11 and 12 to hold them together to form the first cylinder 10 and also to provide compressional force upon the core 14 disposed about the wires 15. The core and wires are located along the central axis of the wrapping device in an axial bore or opening provided by symmetrical axial grooves 16 and 16′ in the cylinders 11 and 12 respectively. The opening thus defined along the central axis of the wrapping device may be substantially circular in cross-section, and as will be seen in FIG. 3A is preferably elongated in one direction to facilitate entrance of the conductors and ferromagnetic material into the opening. The outer diameter of the wrapping device is greater at the ends than in the central portion where the spring 13 is located to hold the spring in place and also to provide driving surfaces for rotation of the device in a manner such that rotation of the spring with respect to the second and third cylinders may be avoided. The cylinder 11 is provided along its non-arcuate surface with a central flat portion 17 disposed adjacent to the groove 16 and with outer beveled or chamfered surfaces 18 and 19 adjacent the flat portion 17. The cylinder 12 is shown as being the same as 11, and is thus provided with a corresponding flat surface 17′ and corresponding beveled surfaces 18′ and 19′. As seen in FIG. 1, when the cylinders 11 and 12 are held in position by the spring 13 the beveled surfaces define diametrically-opposed wedge-shaped slots or longitudinal grooves 20 and 21 with the apex of each slot lying upon a diametral plane of the first cylinder 10 and intermediate the axial bore and the outer surface of the cylinder. The grooves or slots 20 and 21 facilitate entrance of the conductors and core material to the center of the wrapping device in a manner to be described in conjunction with FIGS. 3A–3C.

Figure 3A:
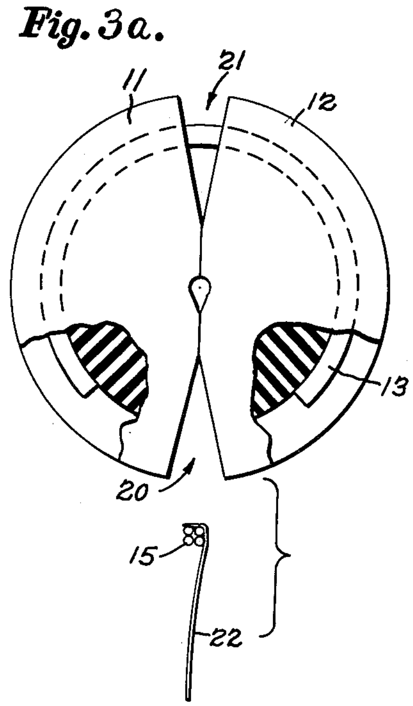
Figure 3B:
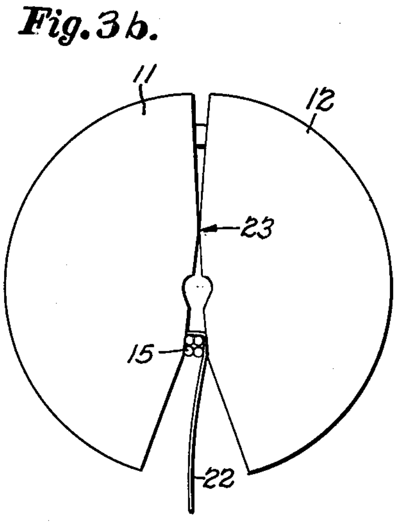
Figure 3C:
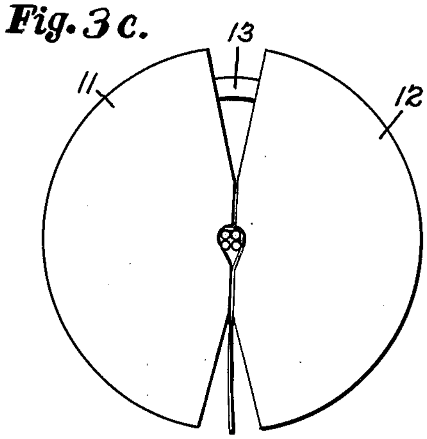
Figure 3D:
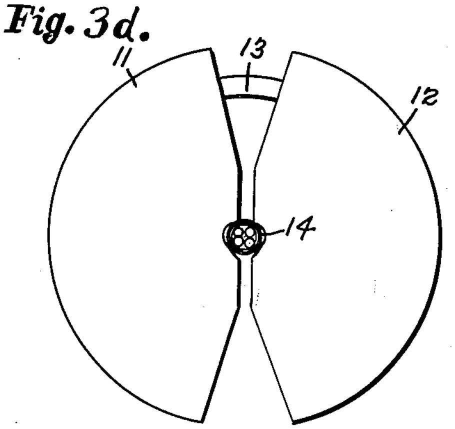

In FIG. 3A it will be seen that the spring 13 encompasses approximately 270° of the wrapping device. This permits assembly of the device by placing the spring about the cylinders 11 and 12 without stressing the spring to an extent which might change its compression characteristic. As will subsequently appear, it is desirable to have the springs 13 for various devices of uniform characteristics to insure uniformity of the signal characteristics of different cores. The spring 13 is so shaped with respect to the reduced circumference of the wrapping device that the cylinders 11 and 12 are in mutual contact along the surfaces 17 and 17′ prior to entrance of the conductors or ferromagnetic material, with the spring opposing any separation of the cylinders 11 and 12.

A strip of ferromagnetic material 22 having high retentivity, such as for example the iron-nickel-molybdenum alloy known as permalloy which has a substantially rectangular hysteresis loop characteristic, is adhered to the top two conductors in the bundle of four conductors 15, and is preferably attached to the outer surface of these conductors since it is found that placing the ferromagnetic material between two of the conductors causes an unbalance of signal characteristics between the conductors. The groove or slot 20 is designed to have an outer width greater than the width or diameter of the bundle of conductors 15 and the strip of material 22 adhered thereto in order to facilitate the entrance of the bundle and material into the axial bore.

As the device is lowered over the wires and strip of material to the position of FIG. 3B wherein the bundle is seen to contact the flat surfaces 19 and 19′, the cylinders 11 and 12 are forced apart with the spring 13 yieldingly opposing any such separation of the cylinders. The slot or longitudinal groove 21 prevents pivoting of the cylinders about their circumferential edges, which might in some cases change the compressional characteristic of the spring, and in fact causes the cylinders to rotate about the line of contact 23 which is intermediate the axial bore and the outer surface of the cylinder 10. Thus the amount of expansion which the spring 13 must undergo during entrance of the bundle 15 and strip 22 can be controlled by varying the pivot point or line of rotation 23. Such variation is in turn accomplished by moving the apex of the wedge-shaped slot 21 to a greater or lesser distance from the center of the cylinder. FIG. 3B also illustrates the advantage of having the axial bore noncircular since it is there seen that the beveled edges forming part of the bore prevent a sudden increase of pressure upon the ferromagnetic material 22 and bundle 15 which would be caused by a decrease in the area of contact as the bundle and strip of material enter the axial bore.

As shown in FIG. 3C the width of the axial opening provided in the wrapping device measured in a direction perpendicular to the surfaces 17–17′ is slightly less than the width of the bundle 15 having the strip 22 adhered thereto. The spring 13 therefore maintains the strip 22 pressed against the bundle of wires 15 during entrance of the bundle and strip into the bore and also after the bundle and strip have been located within the wrapping device. The cross-section of the central axial bore may assume various shapes, as for example a substantially elliptical cross-section with the major axis of the ellipses parallel to the flat surfaces 17 and 17′. In such case the minor axis of the ellipse would be smaller than the width of the bundle having the strip adhered thereto. This would insure a compressional force between the bundle and strip prior to rotation of the wrapping device.

When the wrapping device is rotated with the bundle of conductors stationary and serving as an axis of rotation for the device, the compressional force of the spring 13 urging the cylinders 11 and 12 toward each other causes the strip of material 22 to be wound in a plurality of compact wraps about the bundle of conductors. The unwrapped portion of the strip 22 hangs between the cylinders 11 and 12 during the wrapping operation, and thus the ferromagnetic material is not subjected to excessive tension which might otherwise cause tearing thereof. The cylinders 11 and 12 may be rotated within the spring 13 to cause the surfaces 17 and 17′ to be in contact with the strip 22 and thereby provide a small amount of tension in the strip, but not enough to cause tearing thereof. The wrapping operation causes the cylinders 11 and 12 to be forced apart by the increased amount of ferromagnetic material wrapped about the bundle of wires and thus the device may be described as having an expansible axial opening or bore. The compressional force provided by the spring 13 which yieldingly resists expansion of the bore causes each succeeding wrap of material to be pressed against the preceding wrap and therefore the entrapment of an excessive amount of air between adjacent wraps is avoided. The enlarged cross-section view of a signal storage element produced utilizing the wrapping device of the present invention illustrated in FIG. 4 shows how the compressional force of the spring 13 also causes the initial wraps of tape to conform to the cross-sectional configuration of the bundle. This reduces the amount of air between the bundle and the first wrap of material and thereby increases the efficiency of the core.

By experimentation it has been found that the compressional force applied during the wrapping operation tends to affect the signal characteristics of the resulting core and therefore it is desirable to provide the same compressional force upon each bundle and strip during the wrapping of a plurality of cores in order to obtain uniformity of characterstics between cores. This is easily accomplished in accordance with the present invention since a large number of identical wrapping devices including identical spring elements can be produced and utilized to manufacture the required number of cores, with the wrapping devices being left in position about the core.

The device thus far described lends itself well to an improved method of manufacturing an entire matrix of cores which will now be described with reference to FIG. 5 wherein a portion of a frame 30 having conductive connecting lugs 31 for holding the wires of the matrix is shown. The conductive lugs 31 pass through the insulating frame 30 to provide signal input leads in a manner well known in the art. Since the number of wires about which each core is to be disposed varies in accordance with the particular application of the completed matrix the inclusion of a number of wires in FIG. 5 would serve no useful purpose and would only unnecessarily complicate the drawing. Therefore dashed lines have been drawn to represent the general arrangement of wires with the dashed lines each representing a plurality of wires arranged in a compact bundle, as for example in the manner illustrated in FIG. 4. It is thus seen that a plurality of rows of such bundles is represented in FIG. 5. Individual guide posts 32 may be advantageously used in arranging the conductors in the desired predetermined arrangement, and in the construction of one matrix produced in accordance with the present invention the guide posts were supported in rows by a longitudinal supporting plate 33 having notches in its top surface for receiving an inner and downwardly extending portion of the guide post to prevent movement of the post and thereby define the spacing between adjacent bundles of each row. If the guide posts are made from a nonmagnetic material they may advantageously be left in position without producing adverse effects upon the matrix. In arranging the wires to form the bundles it may prove advantageous to fix each wire of the bundle firmly to the other wires in the bundle, thereby insuring compactness. This can be done by means of an adhesive material, or as described later, by applying a solvent to the material with which certain commercially available wires are coated.

After the wires, which are of course mutually insulated, have been arranged to provide the rows of bundles, a long thin strip of ferromagnetic material 34 is laid across each bundle in a given row and then adhered to each bundle. The spacing between adjacent bundles in a given row is preselected in accordance with the desired signal characteristics of the resulting cores in a manner such that the length of material between adjacent bundles is sufficient to provide enough ferromagnetic material in each core. In the event that more ferromagnetic material is required than would be provided between adjacent cores, a spacing member can be provided between adjacent cores with an elevated surface extending above the plane of the cores. Thus the strip of material can be draped over such spacing member and thence to the bundles to thereby increase the amount of ferromagnetic material for each core. The strip of material is then cut between adjacent bundles in the row, and preferably immediately adjacent to a bundle, to provide a plurality of segments 35 which are adhered to different bundles.

The wrapping devices for encompassing the bundles and segments of material adhered thereto and adapted to provide compressional force thereupon are then placed over the bundles and segments. The wrapping devices 10 are then rotated while they each maintain compressional force upon the wires and material to compactly wind the individual segments 35 about the associated bundles, thereby providing a plurality of multi-stable-state cores. Since the cylinders of the wrapping device can be mass-produced from inexpensive plastic materials, and the springs 13 can be easily manufactured from inexpensive nonmagnetic material it is advantageous to leave the wrapping devices in position about the cores to prevent unwrapping of the ferromagnetic material. Leaving the devices positioned about the cores has a further advantage in that the manufacturing time for each matrix is reduced, and also if the matrix is to be "potted" the wrapper will prevent unwrapping or loosening of the wraps which tends to occur as a result of the heat and pressures normally produced in "potting" operations. It is possible of course to remove the wrapping device and this is illustrated in the top row of the matrix shown in FIG. 5. If the device is removed, however, means such as an adhesive must be provided to prevent unwrapping of the ferromagnetic material, and care must be exercised during the actual removal of the wrapping device.

Rotation of the wrapping devices can be accomplished in a variety of ways, with one method being to bring all of the devices in a given row into contact with a friction surface and then causing relative movement between the friction surface and the devices. The friction surface may advantageously be a belt adapted to move parallel to the rows of bundles, and being wide enough to cover a plurality of rows. In this way an entire matrix can be produced by simultaneously rotating all of the wrapping devices after they have been positioned about the bundles of wires with strips of material adhered thereto.

The wiring arrangement for a given matrix will of course be determined by the signal generating and utilization devices with which the matrix is to be used. Thus the number of wires about which the cores are disposed will vary. Since the cores thus far illustrated have been shown to be disposed about four mutually insulated conductors, the wiring arrangement for a 16 core four-wire matrix is illustrated in FIG. 6. It is there seen that the "Y" or vertical signal wires 40 of the matrix pass directly from one end of the supporting frame to the other while the "X" or horizontal signal wires 41 pass from one side of the supporting frame to the other in a manner such that a segment of each horizontal wire is parallel to each of the vertical wires. Since an "X" input signal 42 applied to a given horizontal conductor passes through adjacent cores in the respective horizontal row in alternate directions the vertical conductors 40 are so arranged that alternate conductors are adapted to receive vertical input signals 43 from different directions, this being illustrated by having opposite ends of alternate vertical conductors grounded. In this way the electromagnetic fields associated with the input signals applied to the horizontal and vertical conductors of the matrix are in the proper direction for the additive effect required for a coincident current signal storage matrix.

A signal output conductor 44 passes through each core in the matrix in a manner such that undesirable signals generated by nonselected cores cancel each other and thereby increase the signal to noise ratio of the output signal provided in the output circuit 45. A fourth conductor 46 passes through each core of the matrix in a manner such that an input bias signal 47 applied throughout the application of signals to the horizontal and vertical conductors opposes the switching of the cores from one stable condition to another in a manner such that the resulting signal applied to the single core which is desired to be switched is increased with respect to the resultant signal upon the cores which are not to be switched. The advantageous effect obtained by utilizing such a bias conductor and bias source 48 is well known in the art and since it forms no part of the present invention will not be further discussed herein. The various signal generating and selecting circuits have not been illustrated since they form no part of the present invention and are also well known in the art. As is evident in FIG. 6, a plurality of rows of bundles containing parallel lengths of the various wires in the matrix can be provided without impairing the required wiring arrangement.

The wrapping device of the present invention can be easily manufactured using well-known mass production techniques. The process of injection molding, for example, was used to produce a number of the cylinders 11 and 12 using a plastic compound, with the springs 13 having been made of a Phosphor bronze alloy. The wrapping devices constructed in this way were used in the manufacture of a multi-core matrix using the method of the present invention. Cold rolled permalloy tape 0.000125 inch thick and 0.125 inch wide was used for the ferromagnetic core material, the tape having been severed between adjacent cores in each row to provide 0.500 inch segments attached to each bundle of conductors. A wire produced by Phelps Dodge Copper Products Corporation and known as Bondeze Magnetic Wire (No. 2) is advantageous in the manufacture of cores by the present invention since the tape can be adhered to the bundle of wires by being placed in contact therewith subsequent to the application of isopropyl alcohol to the wires. This also bonds the wires in a compact bundle, serving thereby to hold the wires in the desired configuration. Various methods of attaching the ferromagnetic material to the wires will of course be evident to persons working in this field, and the above method is therefore only given as an example of one successful method. The cores of the matrices constructed in the above manner were found to have substantially identical signal characteristics.

There has thus been disclosed an improved device for compactly wrapping a thin strip of ferromagnetic material about a plurality of conductors to provide a signal storage element, and also an improved method of manufacturing a multi-core memory matrix.

What is claimed is:

1. A device for wrapping a thin strip of rectangular hysteresis loop magnetic material about a bundle of conductors comprising, a nonmagnetic cylindrical element having a radially expansible axial opening of diameter substantially equal to the diameter of said bundle and adapted to encompass said bundle, said element further having a wedge-shaped slot extending for the full length thereof to facilitate radial entrance of said bundle to said opening, and means yieldingly opposing expansion of said opening.

2. A wrapping device adapted to be placed about a bundle of insulated wires having a thin strip of high retentivity magnetic material adhered thereto, and then rotated to wrap the material about the wires to provide a magnetic signal storage element, comprising, a right cylinder of nonmagnetic material having an axial opening for receiving the bundle and a longitudinal wedge-shaped slot extending radially from the periphery of the cylinder toward said opening and extending the full length of the cylinder for permitting entrance of the bundle to said opening, and means providing uniform compressional force upon the bundle and upon the wraps of tape formed as the device is rotated.

3. A wrapping device as defined in claim 2, wherein the apex of said wedge-shaped slot lies upon a diametral plane of said cylinder between said opening and the outer surface of said cylinder.

4. A wrapping device as defined in claim 2 wherein the width of said opening is substantially equal to the width of said bundle.

5. A device for wrapping a thin strip of rectangular hysteresis loop magnetic tape about a compact bundle of conductors to provide a multi-stable state signal storage element comprising in combination, a right circular cylinder of nonmagnetic material having an expansible cylinderical axial opening and a longitudinal slot extending throughout the length of said cylinder for permitting entrance of said conductors to said opening, the diameter of said opening being substantially equal to the diameter of said bundle and the outer portion of said slot being wedge-shaped, and spring means encompassing said cylinder and yieldingly resisting expansion of said opening as the diameter thereof is increased by successive wraps of tape being formed about said bundle.

6. A device for wrapping metallic magnetic tape about a plurality of wires gathered to form a compact longitudinal bundle which includes parallel segments of said wires, said device comprising, first and second elements forming a right circular cylinder having a central axial bore, said elements further defining first and second diametrically opposed longitudinal wedge-shaped slots extending from the circumference of said cylinder toward said bore for the full length of said cylinder, and spring means holding said elements in position to form said cylinder and yieldingly resisting radial expansion of said bore.

7. A device as defined in claim 6 wherein said elements are symmetrical with respect to the central longitudinal axis of said cylinder.

8. A device for wrapping magnetic tape having a rectangular hysteresis loop characteristic about a bundle of individually insulated wires to form a bistable state magnetic signal storage unit comprising in combination, first and second right cylinders of nonmagnetic material each having an axial groove and first and second longitudinal beveled surfaces each extending throughout the length of the cylinders, spring means yieldingly holding said elements together to form a third right cylinder with said axial grooves defining an axial bore therethrough and with said beveled surfaces defining diametrically opposed wedge-shaped slots to facilitate entrance of said bundle to said bore.

9. A device as defined in claim 8 wherein the width of said bore is less than the width of said bundle plus the thickness of said tape.

10. A device for compactly wrapping a strip of rectangular hysteresis loop magnetic material about a plurality of conductors to provide a bistable state magnetic storage unit comprising, a right circular cylinder of nonmagnetic material including first and second elements symmetrical with respect to the central longitudinal axis of said cylinder and defining a central axial opening through said cylinder, a nonmagnetic spring substantially encompassing said cylinder and urging said elements together, said elements further defining a first wedge-shaped axial slot extending from the outer surface of said cylinder toward said opening to permit entrance of said conductors to said opening and a second wedge-shaped axial slot diametrically opposed to said first slot and adapted to permit pivoting of said parts about a point between said opening and the outer surface of said cylinder during entrance of said conductors to said opening.

11. A signal storage device comprising in combination: first and second right cylinders of nonmagnetic material; spring means yieldingly maintaining said cylinders in juxtaposition to form a third right cylinder having a radially expansible axial opening and first and second diametrically opposed wedge-shaped slots each extending from the circumference of the cylinder toward said opening; a plurality of conductors disposed within said opening; and a thin strip of rectangular hysteresis loop magnetic material wrapped about said conductors.

12. A matrix of signal storage devices comprising a plurality of nonmagnetic cylindrical elements each having a radially expansible axial opening; a plurality of insulated conductors arranged to form a plurality of wire groups each disposed within one of said openings and each containing a straight portion of at least two of said conductors; a plurality of thin strips of magnetic material each wrapped about one of said groups; and individual spring means disposed about each of said elements for maintaining a compressional force on the material wrapped about the associated group of conductors.

References Cited in the file of this patent

UNITED STATES PATENTS

| | | |
|---|---|---|
| 1,501,480 | Dye | July 15, 1924 |
| 1,904,394 | Vacher | Apr. 13, 1933 |
| 2,323,741 | Watson | July 6, 1943 |
| 2,824,294 | Saltz | Feb. 18, 1958 |
| 2,836,881 | Pollock | June 3, 1958 |
| 2,867,032 | Gehrke et al. | Jan. 6, 1959 |
| 2,910,675 | Gessner | Oct. 27, 1959 |
| 2,927,415 | Smith | Mar. 8, 1960 |
| 2,970,296 | Horton | Jan. 31, 1961 |

OTHER REFERENCES

Publication I: "Three Dimensional Printed Wiring," by Guditz in Electronics, Vol. 30, No. 6, June 1, 1957, pp. 160–163.

Publication II: "Core Memory Structures Suited to Automation Assembly," by Quan, Newhouse and McGahey, Jr., in RCA Technical Notes #6, Aug. 9, 1957.